United States Patent [19]
Phillips et al.

[11] 4,158,477
[45] Jun. 19, 1979

[54] OPTICAL FIBER SPLICE

[75] Inventors: Michael J. Phillips, Shipley; John D. Archer, Lightcliffe, both of England

[73] Assignee: Internatonal Standard Electric Corporation, New York, N.Y.

[21] Appl. No.: 818,039

[22] Filed: Jul. 22, 1977

[30] Foreign Application Priority Data

Jul. 29, 1976 [GB] United Kingdom ............... 31623/76

[51] Int. Cl.² ............................................. G02B 5/14
[52] U.S. Cl. ............................................. 350/96.21
[58] Field of Search ................ 350/96.20, 96.21, 96.22

[56] References Cited

U.S. PATENT DOCUMENTS

| | | | |
|---|---|---|---|
| 3,455,625 | 7/1969 | Brumley et al. | 350/96.22 |
| 3,861,781 | 1/1975 | Hasegawa et al. | 350/96.21 |
| 3,972,585 | 8/1976 | Dalgleish et al. | 350/96.21 |
| 4,015,894 | 4/1977 | Rocton | 350/96.21 |
| 4,026,633 | 5/1977 | Crick | 350/96.21 |

OTHER PUBLICATIONS

"Fibre Optic Connectors an Effective Solution", Electronic Engineering, Apr. 1975, p. 55.

Primary Examiner—John K. Corbin
Assistant Examiner—Stewart Levy
Attorney, Agent, or Firm—John T. O'Halloran; Peter C. Van Der Sluys; Stephen Goldman

[57] ABSTRACT

An optical fiber splice is formed by means of a pair of watch jewels concentrically aligned within a cylindrical ferrule. The plastic is stripped back from a pair of fibers to expose their cores and each core is inserted into one of the jewels for precise alignment.

6 Claims, 3 Drawing Figures

OPTICAL FIBER SPLICE

BACKGROUND OF THE INVENTION

This invention relates to methods of coupling optical transmission fiber and in particular to a fiber splice of the type employing a pair of watch jewels or a single X-jewel as a means of aligning the two fibers.

Co-pending U.S. application No. 776,597 (M. A. Bedgood-J. S. Leach 5-1) filed Mar. 11, 1977, describes an optical fiber connector arrangement for coupling a pair of fibers, including an X-jewel whose bore corresponds to the diameter of the fibers, and means for mounting the fibers such that they meet end to end in the bore of the X-jewel.

The arrangement described in application Ser. No. 776,597 is primarily intended for use as a demountable connector. There are some applications however in which a permanent fiber splice coupling is more suitable.

SUMMARY OF THE INVENTION

According to the present invention there is provided a splice arrangement for coupling a pair of optical fibers, including a tubular ferrule for receiving the two fibers to be spliced, an X-jewel, or a pair of watch jewels arranged back to back, in the ferrule, and means for securing the fibers in the ferrule such that the fiber ends meet in alignment in the bore of the jewel or jewels.

DESCRIPTION OF THE PREFERRED EMBODIMENT

Figure 1:
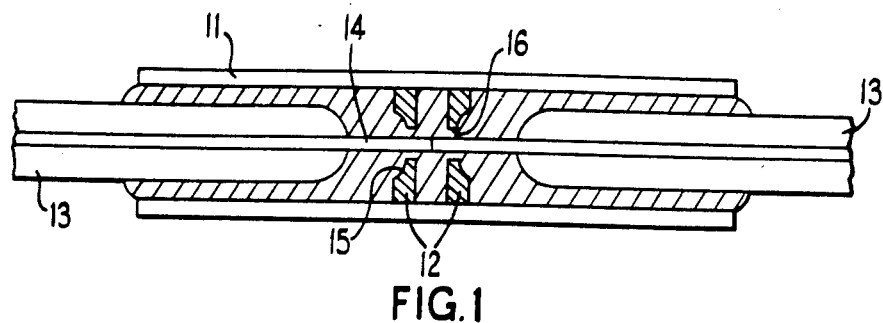
FIG. 1 is a sectional view of a fiber splice coupling according to the invention.

Referring to FIG. 1, the arrangement includes a cylindrical tubular ferrule 11, in the bore of which a pair of watch jewels 12 are arranged back to back. Plastics coated optical fibers 13 having their ends bared are inserted one at each end of the ferrule so that each fiber end 14 is guided by the recess 15 into the bore 16 of the respective watch jewel 12. The clearance between the fibers and the bore 16 is exaggerated in the drawings for the purpose of clarity.

When the fibers 13 are fully inserted with their ends 14 in abutment as shown in FIG. 1 the ferrule is filled with an epoxy resin which is heat cured to secure the fibers. The pair of watch jewels ensures accurate alignment of the fiber ends 14.

Figure 2:
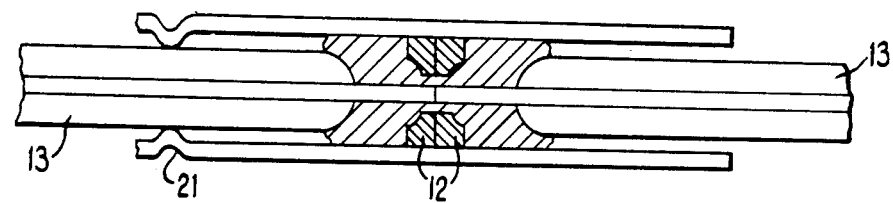
FIG. 2 is a sectional view of an alternate embodiment of the coupling of FIG. 1.

FIG. 2 shows an alternative splice in which the two jewels 12 are arranged in abutment and surrounded by a liquid which is refractive index matched to the fiber materials. The fibers 13 are secured in the splice by annular crimps 21 which are applied when the fibers are correctly fitted to the splice.

The fibers 14 are fitted to the splice couplings of FIG. 1 and 2 by the following process.

A short length of the plastics coating of each fiber is removed by conventional techniques to expose the bare fiber end which is then cleaved to produce an optically flat end surface. The two fibers are then clamped in a jig and introduced into opposite ends of the ferrule together with a quantity of liquid epoxy resin or index matching fluid. The jig ensures that the fibers are slid into the ferrules by a distance such that the fiber ends enter the jewel bores guided by the recesses and come into abutment without excessive axial force being exerted.

Figure 3:
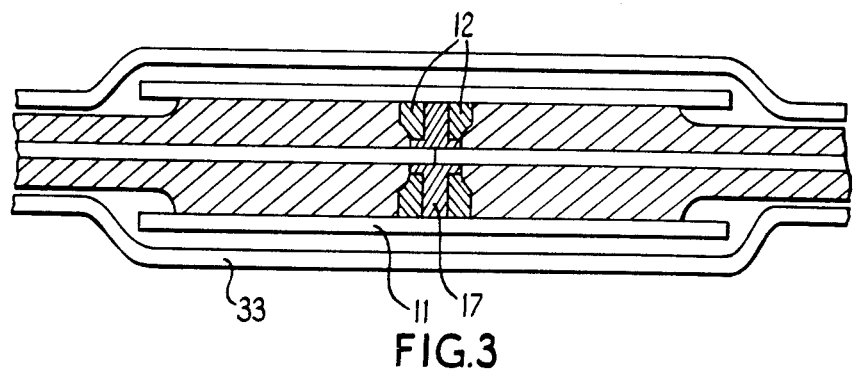
FIG. 3 is a sectional view of a further embodiment of the splice coupling of FIG. 1.

FIG. 3 shows an alternative method of fitting the fibers to the splice coupling. In the coupling the ferrule 11 and jewels 12 are arranged as in FIG. 1, but the space between the joints is filled with an index matching liquid 17. In this arrangement the fibers are fitted to the coupling by a fusion technique similar to that described in our aforementioned co-pending application. The ferrule 11 containing the jewels 12 is heated to a temperature a little above the softening point of the plastics material coating the fiber 14. The two fibers are introduced, together with a quantity of index matching liquid, into the coupling with the aid of the jig. The plastics material softens allowing the fiber ends to emerge from the coating and enter the bores of the respective jewels until they are in abutment as shown in FIG. 3. At the same time the plastics material flows so as to fill the bore of the ferrule 11. The assembled splice coupling is then allowed to cool to set the plastics materials and the assembly is protected by a heat shrinkable plastics sleeve 33.

In some applications the back to back jewel arrangement of the splice couplings of FIGS. 1 to 3 may be replaced by a single X-jewel. However, an advantage of using two back-to-back jewels is that a gap can be left between the jewels which will be filled with index-matching fluid 17. This allows a lower standard of fiber clearance to be tolerated while still achieving low-loss joints.

The coupling arrangement is intended for use with optical fibers of the plastics coated clad silica type but may of course be employed with other types of plastics coated glass or silica optical fibers.

We claim:

1. A splice arrangement for coupling a pair of optical fibers comprising:
   a tubular ferrule for receiving the fibers to be spliced;
   a pair of spaced apart watch jewels within said ferrule having a central hole for receiving one end of the fibers to be spliced, such that the fiber ends abut between said spaced apart jewels; and
   means for permanently securing the fibers in said ferrule.

2. The splice arrangement as set forth in claim 1, further including a refractive index matching liquid surrounding said abutted fiber ends thereby achieving a low loss coupling.

3. The splice arrangement as set forth in claim 1, further including a protective plastic outer sleeve over said ferrule.

4. The splice arrangement as set forth in claim 1, wherein said securing means comprises a softenable material coating said fibers.

5. The splice arrangement as set forth in claim 1, wherein said pair of watch jewels comprise X-jewels.

6. The splice arrangement as set forth in claim 1 wherein said coupling is a permanent coupling.